(12) United States Patent
Gasworth et al.

(10) Patent No.: US 8,236,383 B2
(45) Date of Patent: Aug. 7, 2012

(54) ABRASION RESISTANT PLASTIC GLAZING WITH IN-MOLD COATING

(75) Inventors: Steven M. Gasworth, Novi, MI (US); Chengtao Li, Novi, MI (US); Sunitha Grandhee, Novi, MI (US)

(73) Assignee: Exatec LLC, Wixom, MI (US)

( * ) Notice: Subject to any disclaimer, the term of this patent is extended or adjusted under 35 U.S.C. 154(b) by 946 days.

(21) Appl. No.: 12/110,480

(22) Filed: Apr. 28, 2008

(65) Prior Publication Data

US 2008/0265459 A1    Oct. 30, 2008

Related U.S. Application Data

(60) Provisional application No. 60/914,560, filed on Apr. 27, 2007.

(51) Int. Cl.
*B28B 1/30* (2006.01)
*C23C 16/00* (2006.01)

(52) U.S. Cl. .................. 427/372.2; 427/248.2; 427/331; 427/299; 264/4; 264/129; 264/131; 264/132; 264/250

(58) Field of Classification Search .................. None
See application file for complete search history.

(56) References Cited

U.S. PATENT DOCUMENTS

| | | | |
|---|---|---|---|
| 4,076,788 A | 2/1978 | Ditto | 264/255 |
| 4,081,578 A | 3/1978 | Van Essen et al. | 428/63 |
| 4,189,517 A | 2/1980 | Shanoski et al. | 428/423.7 |
| 4,222,929 A | 9/1980 | Shanoski et al. | 260/40 |
| 4,293,659 A | 10/1981 | Svoboda | 525/28 |
| 4,366,109 A | 12/1982 | Svoboda | 264/255 |
| 4,534,888 A | 8/1985 | Cobbledick et al. | 252/511 |
| 4,637,904 A | 1/1987 | Rounds | 264/259 |
| 4,668,460 A | 5/1987 | Ongena | 264/255 |
| 4,842,941 A | 6/1989 | Devins et al. | |
| 5,387,750 A | 2/1995 | Chiang | 528/52 |
| 5,529,728 A * | 6/1996 | Buazza et al. | 264/1.38 |
| 5,658,672 A | 8/1997 | Lenke et al. | 428/423.1 |
| 5,676,901 A | 10/1997 | Higashi et al. | 264/255 |
| 5,693,366 A * | 12/1997 | Mase et al. | 427/164 |
| 5,736,090 A | 4/1998 | Yamamoto et al. | 264/255 |
| 5,777,053 A | 7/1998 | McBain et al. | 526/301 |
| 5,902,534 A | 5/1999 | Fujishiro et al. | 264/255 |
| 6,126,792 A * | 10/2000 | Grunwald et al. | 204/192.14 |
| 6,180,043 B1 | 1/2001 | Yonemochi et al. | 264/255 |

(Continued)

FOREIGN PATENT DOCUMENTS

EP    0 285 870    10/1988

(Continued)

OTHER PUBLICATIONS

Schaepkens, M. J. Vac. Sci. Technolo. A 21(4), Jul./Aug. 2003. p. 1266-1271.*

(Continued)

*Primary Examiner* — Joseph Miller, Jr.
(74) *Attorney, Agent, or Firm* — Cantor Colburn LLP (57) ABSTRACT

This invention relates to plastic glazing assemblies for vehicle tops, windows, headlamps, and taillights, as well as residential and commercial glazing, aircraft glazing, and sunglasses. More specifically, a method of manufacturing a plastic glazing assembly exhibiting a high level of weatherability and abrasion resistance is disclosed which integrates the in-mold application of a coating and the subsequent deposition of an abrasion resistant layer to a molded plastic part.

30 Claims, 5 Drawing Sheets

U.S. PATENT DOCUMENTS

| | | | |
|---|---|---|---|
| 6,309,755 B1 | 10/2001 | Matsco et al. | |
| 6,617,033 B1 | 9/2003 | Straus et al. | 428/424.2 |
| 6,720,076 B2 | 4/2004 | McBain | 428/412 |
| 6,793,861 B2 | 9/2004 | McBain et al. | 264/255 |
| 6,797,384 B2 | 9/2004 | Gasworth et al. | |
| 6,822,058 B1 | 11/2004 | Kramer et al. | 526/142 |
| 6,890,469 B2 | 5/2005 | Straus et al. | 264/255 |
| 6,890,586 B2 | 5/2005 | Beck et al. | 427/133 |
| 7,045,213 B2 | 5/2006 | Straus | 428/412 |
| 7,309,221 B2 | 12/2007 | Okahara et al. | 425/112 |
| 7,314,590 B2 | 1/2008 | Yeager | 264/255 |
| 7,703,413 B2 | 4/2010 | Miebach et al. | |
| 7,732,041 B2 | 6/2010 | Grandhee et al. | |
| 2001/0038890 A1* | 11/2001 | Buazza et al. | 428/1.1 |
| 2001/0041251 A1* | 11/2001 | Bravet et al. | 428/213 |
| 2002/0015801 A1 | 2/2002 | Emch | |
| 2002/0041346 A1* | 4/2002 | Faris et al. | 349/16 |
| 2002/0110695 A1* | 8/2002 | Yang et al. | 428/447 |
| 2002/0136909 A1* | 9/2002 | Yang | 428/447 |
| 2002/0164484 A1* | 11/2002 | Jiang et al. | 428/412 |
| 2003/0003280 A1* | 1/2003 | Masterson et al. | 428/195 |
| 2003/0030172 A1 | 2/2003 | Hoogland et al. | |
| 2003/0045637 A1 | 3/2003 | Hoshida et al. | |
| 2003/0072881 A1 | 4/2003 | Yang et al. | |
| 2004/0115302 A1* | 6/2004 | Rommes et al. | 425/526 |
| 2004/0148051 A1 | 7/2004 | Straus | 700/198 |
| 2004/0191521 A1 | 9/2004 | Weiss et al. | |
| 2005/0156351 A1 | 7/2005 | Straus et al. | 264/236 |
| 2005/0158554 A1 | 7/2005 | Wang et al. | |
| 2005/0202184 A1 | 9/2005 | Iacovangelo et al. | |
| 2005/0202263 A1* | 9/2005 | Sargent et al. | 428/500 |
| 2005/0284374 A1 | 12/2005 | Miebach et al. | |
| 2006/0025496 A1* | 2/2006 | Grandhee et al. | 523/160 |
| 2006/0076712 A1* | 4/2006 | Yonemochi et al. | 264/255 |
| 2006/0097425 A1 | 5/2006 | Okahara et al. | 264/255 |
| 2006/0118999 A1* | 6/2006 | Cooper et al. | 264/255 |
| 2006/0125151 A1 | 6/2006 | McBain et al. | 264/328.8 |
| 2006/0138699 A1 | 6/2006 | Zollner et al. | |
| 2006/0204746 A1* | 9/2006 | Li et al. | 428/332 |
| 2006/0210772 A1 | 9/2006 | Bui et al. | |

FOREIGN PATENT DOCUMENTS

| | | |
|---|---|---|
| EP | 0597624 A1 | 5/1994 |
| EP | 1060930 A1 | 12/2000 |
| EP | 1 207 031 | 5/2002 |
| JP | 62025024 A | 2/1987 |
| WO | 0078520 A1 | 12/2000 |
| WO | WO 2006/072177 | 7/2006 |
| WO | WO 2006/121484 | 11/2006 |

OTHER PUBLICATIONS

Definition of Sequentially, Merriam-Webster (online dictionary).*
Written Opinion of the International Preliminary Examining Authority, 2009, related to PCT/US2008/061748.
International Search Report and Written Opinion of International Application PCT/US2008/061748, 2008.
Aengenheyster: "Grosser Markt Fuer Grosse Scheiben," Plastverarbeiter, Huethig GmbH, Heidelberg, Germany, vol. 55, No. 10, Oct. 2004, pp. 146-149.
Hopmann C et al: "Automobilscheiben aus Kunststoff," Kunststoffe, Carl Hanser Verlag, Munchen, Germany, No. 2/05, Feb. 2005, pp. 22-27.
"Coatings for Plastic Glazing," Automotive Engineering, Society of Automotive Engineers, Warrendale, Pennsylvania, U.S., vol. 101, No. 5, May 1993, pp. 24-28.
International Search Report and Written Opinion of the International Searching Authority; International Application No. PCT/US2008/062251; International Filing Date: May 1, 2008; Date of Mailing: Aug. 11, 2008; 14 Pages.

* cited by examiner

| | |
|---|---|
| 110 | AR Layer |
| 105 | IMC coating |
| 115a | PMMA film |
| 115b | PC film |
| 100 | Molded Part |
| 110 | AR Layer |

A = Exterior of vehicle  
B = Interior of vehicle

Figure 3B

| | |
|---|---|
| 110 | AR Layer |
| 120 | Silicon Hard-Coat |
| 100 | Molded Part |
| 105 | IMC coating |
| 110 | AR Layer |

A = Exterior of vehicle  
B = Interior of vehicle

| | |
|---|---|
| A = Exterior of Vehicle | 110 AR Layer |
| | 105 IMC Coating |
| | 115a PMMA film |
| | 115b PC film |
| | 100 Molded Part |
| | 105 IMC Coating |
| | 130 Functional Layer |
| | 110 AR Layer |

A side ⋯ (between 115a/115b and 100)
B side ⋯ (between 100 and 105)

B = Interior of Vehicle

Figure 3E

ABRASION RESISTANT PLASTIC GLAZING WITH IN-MOLD COATING

CROSS REFERENCE TO RELATED APPLICATION

This application claims the benefit of U.S. Provisional Application Ser. No. 60/914,560 filed on Apr. 27, 2007, entitled "In-Mold Coating (IMC) For Plastic Glazing," the entire contents of which are incorporated herein by reference.

FIELD

This invention relates to plastic glazing assemblies for vehicle tops, windows, headlamps, and taillights, as well as residential and commercial glazing, aircraft glazing, and sunglasses.

BACKGROUND

Plastic glazing assemblies require a coating that can provide the assembly with acceptable performance properties, such as weatherability and interfacial adhesion with the underlying plastic substrate, as well as with any subsequently deposited abrasion resistant layer. Conventional methods of applying coating compositions include flow coating, dipping, spraying, spin coating, and curtain coating. All of these methods can apply a coating to a previously formed plastic sheet followed by the curing of the applied coating through a time consuming and energy inefficient process. A thermal curing method may require heating the coated glazing assembly for about 15 to 120 minutes at a temperature in excess of 100° C. The curing method may need to be performed multiple times depending upon whether the coating is comprised of multiple layers, such as a primer and topcoat. The time required for curing a conventional coating and the energy input necessary to achieve the required cure conditions substantially increases the manufacturing cost associated with a plastic glazing assembly. In addition, conventional coating methods lack high transfer efficiency rates, which when coupled with the presence of non-environmentally friendly solvents, require the manufacturer to further increase manufacturing costs by having to dispose of coating waste and scrapped parts, reduce air emissions, and provide for the installation and maintenance of a large coating line or facility.

Furthermore, many conventional coatings are either not compatible with the deposition of an abrasion resistant layer or are expensive due to the polymers and additives that make up their composition. More specifically, coatings that typically incorporate various inexpensive organic polymers in the coating matrix are not conducive to being a surface upon which a substantially inorganic abrasion resistant layer can effectively adhere. On the other hand, a coating comprising a silicon hard-coat (SHC), which is compatible with the deposition of an abrasion resistant layer, is many times more expensive than a conventional organic coating.

Therefore, there is a need in the industry to reduce the manufacturing costs associated with a plastic glazing assembly by reducing or eliminating the substantial costs of curing a conventional coating. There is also a need to insure that the coating applied to the plastic glazing assembly is compatible with the deposition of an abrasion resistant layer in order to provide the plastic glazing assembly with the necessary level of abrasion resistance required to function in an application over an extended life-time.

SUMMARY

In overcoming the drawbacks and limitations of applying a conventional weatherable coating to a plastic glazing assembly, an economical method of manufacturing a highly weatherable and abrasion resistant plastic glazing assembly is presented. This economical manufacturing method involves the steps of injecting a plastic resin into a mold of the desired shape to form a plastic part having an A-side and a B-side; applying a weatherable coating that adheres to the surface of at least one side of the plastic part; curing the weatherable coating on the surface of the plastic part; then after curing, removing the coated part from the mold; and finally depositing an abrasion resistant layer that adheres to the surface of the A-side and B-side of the coated part. This manufacturing method allows for both the cured weatherable coating and the deposited abrasion resistant layer to have a relatively uniform and constant thickness.

It is anticipated that the method of manufacturing a plastic glazing assembly, such as an automotive window, will typically be completed in less than about 10 minutes with less than about 5 minutes being possible. The part is not manually manipulated until after the abrasion resistant layer is deposited. Rather the weatherable coating is cured on the part in the mold using a thermal cure, radiation cure, or a combination of both. The coated part is preferably removed from the mold via a robot and hung on a holder mechanism that represents a subcomponent of the mechanical system used to transport the part from the mold through the deposition of the abrasion resistant layer using a vacuum deposition technique, such as plasma enhanced chemical vapor deposition.

In another embodiment, a plastic film may be placed into the mold prior to injecting the plastic resin. This plastic film is formed to substantially match the shape of one surface of the mold cavity, such as the surface that would correspond to the A-side of the plastic part. The plastic film may have a border, defroster, antenna, or logo printed on it prior to being placed into the mold. Thereafter, the plastic film becomes melt bonded to the resin injected into the mold.

In yet another embodiment, storage of the coated part may be necessary before the deposition of an abrasion resistant layer. In this case, the storage is preferably done in at least a class-100 clean room as defined according to ISO cleanroom standard 14644-1, and the surface of the coated part is cleaned prior to proceeding with the deposition of the abrasion resistant layer. The cleaning is accomplished using one of an aqueous wash system, alcohol wiping, alcohol rinsing, or a combination thereof.

In another embodiment, a functional layer is deposited onto at least one surface of the coated window prior to the deposition of the abrasion resistant layer. An example of such a functional layer is titanium dioxide, which is useful for blocking UV radiation.

In yet another embodiment, the weatherable coating is applied to the surface of the mold, a barrier film is pressed against the coating to prevent exposure to oxygen, the coating is cured, the barrier film is removed, and then the mold is closed and the plastic resin injected. In this case, the barrier film has no affinity for the weatherable coating and the weatherable coating is preferably cured using UV radiation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present invention or its application or uses. It should be understood that throughout the description and drawings, corresponding reference numerals indicate like or corresponding parts and features.

Figure 1:
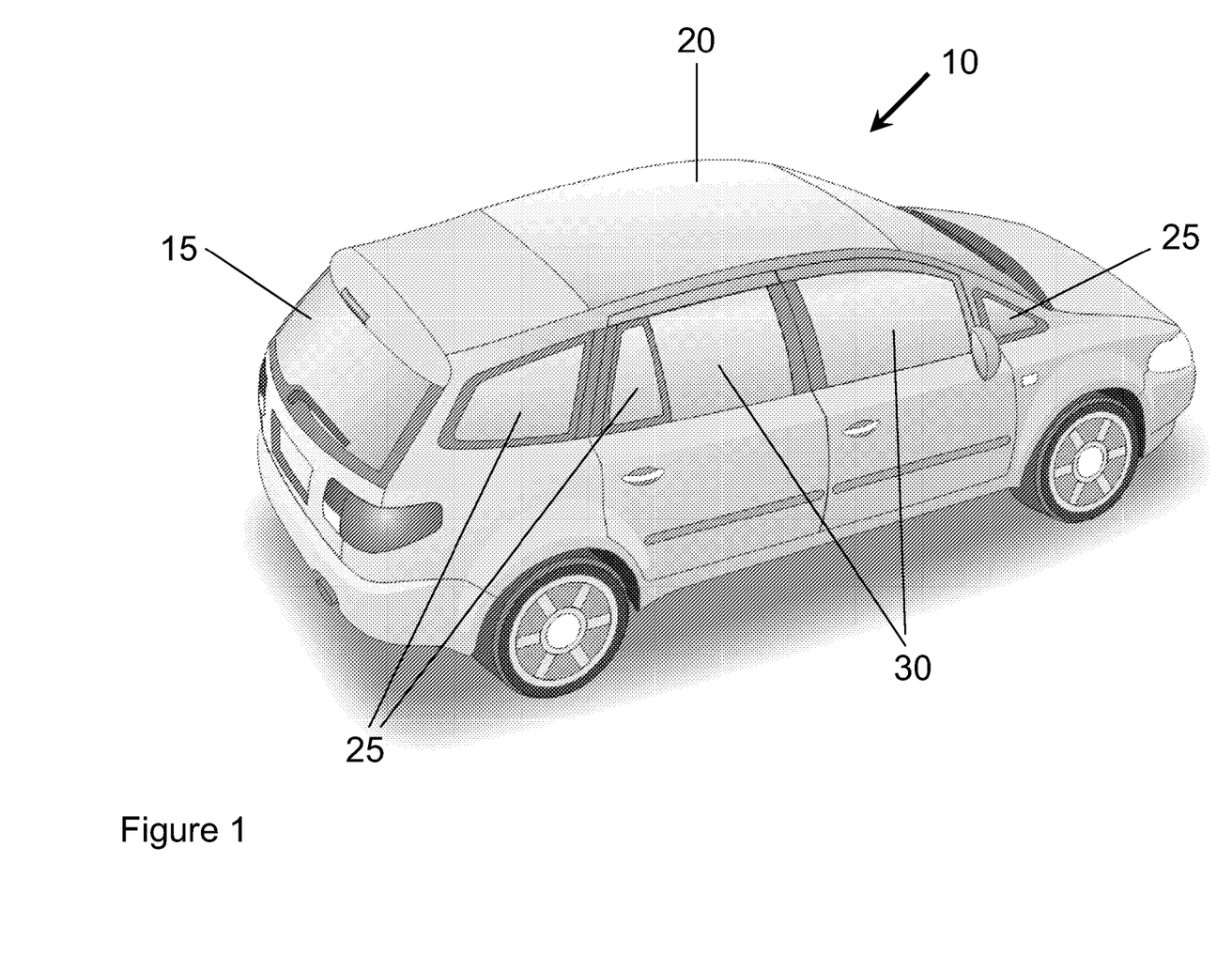
FIG. 1 is a depiction of an automobile incorporating plastic windows according to the principles of the present invention.

The present invention provides an economical method of manufacturing a plastic glazing assembly that exhibits a high level of weatherability and abrasion resistance. Referring to FIG. 1, a plastic glazing assembly may be used on an automobile 10 as a window. Non-inclusive examples of windows include a backlite 15, sunroof 20, fixed side window 25, and movable side window 30. One skilled-in-the-art of automotive design will realize that the plastic glazing system of the present invention can be used for other automotive components, including but not limited to, body panels, pillars, headlamps, taillights, and cowels. Since the process of the present invention simplifies the operation steps of many current processes, reduce costs, and provides for the incorporation of numerous functional elements (e.g., solar control, defroster, antenna, printed blackout/fadeout, & UV blocking) into the resulting plastic glazing assembly, these assemblies will find use in multiple market areas, including but not limited to, automotive glazing, residential and commercial glazing, aircraft glazing, and sunglasses.

Figure 2:
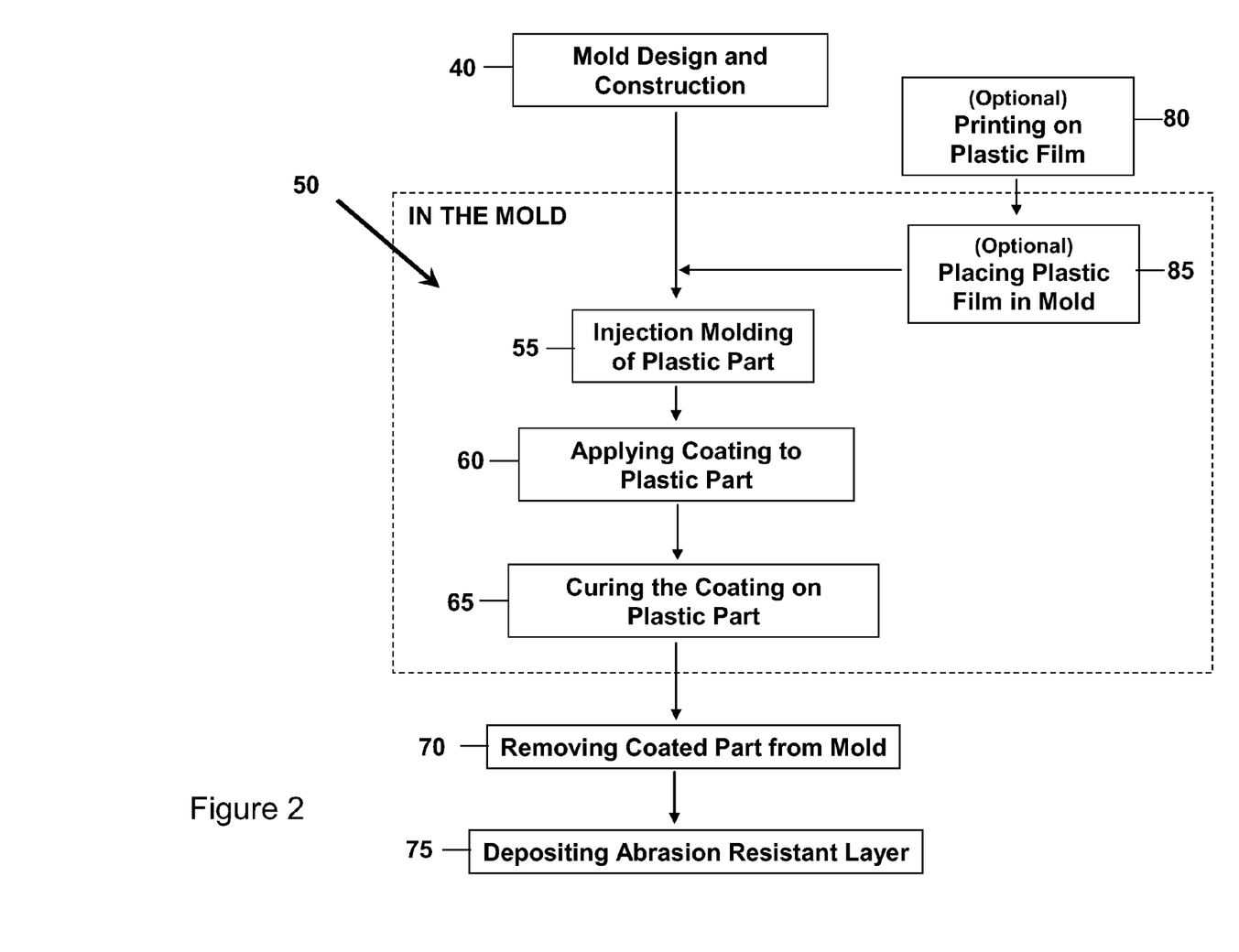
FIG. 2 is a schematic of a manufacturing process for a plastic glazing assembly according to one embodiment of the present invention.

Referring to FIG. 2, an economical manufacturing process may generally be defined by designing and constructing 40 a mold having the desired part geometry followed by a sequence of steps that take place within the mold 50. This sequence of steps include the injection molding 55 of the plastic part, the application 60 of an in-mold coating (IMC) to the plastic part, and the curing 65 of the IMC coating on the plastic part. Subsequent removal 70 of the coated part followed by the deposition 75 of an abrasion resistant layer completes the formation of a plastic window assembly that exhibits the desired level of abrasion resistance. If the IMC coating includes a means to absorb or reflect UV radiation, then the plastic window assembly may also exhibit the desired level of weatherability. One advantage to the process of the present invention is that the cured IMC coating and the abrasion resistant layer may exhibit relatively uniform and constant thicknesses, thereby, imparting uniform properties, such as weatherability and abrasion resistance, to the plastic glazing assembly.

Various components associated with the mold 50 for making a plastic glazing assembly, via an in-mold applied coating process, would preferably entail the use of an injection-compression molding machine with the necessary control of resin flow, pressure, and temperature to insure the formation of a plastic part that exhibits low stress; a rotating stack mold with at least one needle gate to inject the coating formulation; a plastic resin; a fast curable (at molding temperature condition) coating formulation; and a coating metering unit or delivery cart.

The molding cycle for a plastic glazing assembly includes filling (injection and compression or coin), packing and cooling. Rigid plastics are typically a compressible polymer, so after the filling stage, the mold is slightly opened to create a gap and a certain amount of the IMC coating is injected through a needle by the coating delivery system into the created gap. The nozzle and gate in this coating delivery system are designed so that the coating formulation will be even distributed onto the surface of the molded part and meantime further compress and pack the plastic part. The temperature profile is controlled according to the selected IMC coating formulation (e.g., cure temperature and cure time) and plastic molding cycle. The molded part comes out of the mold with the IMC coating fully cured and ready for next operation, such as the deposition of an abrasion resistant layer.

A coating cart is used to completely isolate the IMC coating and provide a means of metering a desired quantity of this coating to the mold. Isolation of the coating reduces any the chance that the coating may become contaminated from the environment of the manufacturing plant. The use of proportional closed loop hydraulics with respect to the coating cart ensures that the dispensing of the IMC coating is accurate. The pressure used to inject the IMC coating into the mold can be as high as about 6,000 PSI.

Film insert molding can be combined with the in-mold coating delivery system to integrate additional functionalities, such as a decoration or a defroster/antenna. As further shown in FIG. 2, various optional elements may include the placing and fixing 85 a plastic film into the mold to provide additional benefits, such as solar control, electro-chromaticity, or UV radiation resistance. The placement of a film into the mold may utilize a handling system (not shown) typically known to one skilled-in-the-art of film insert molding (FIM). This plastic film may further include additional functionality, such as an opaque border, logos, a defroster grid, an electroluminescent pattern, an antenna, or a combination thereof. Such additional functionality may be printed onto the film prior to its insertion 80 into the mold or through the use of additional injection ports in the mold itself resulting in a process referred to as in-mold printing (not shown). Other optional components in the process (not shown) may include an additional spray application system for applying a IMC coating to the surface of the mold prior to injecting the plastic resin, a UV-curing system for curing the IMC coating, and a clean room that may encompass the mold 50 and system that removes 70 the window from the mold or potentially, even the entire operation.

In an embodiment of the present invention, employing film insert molding (FIM), a plastic FIM film is placed and fixed onto one side of the mold, either on the cavity or core side, depending on the tool and gate design and the functionality of the film itself. For example, if the purpose of the FIM film is to provide weatherability or defrosting capability to the plastic glazing assembly, it would be preferable to have the film located on the external or A-side surface of the finished part. If the purpose of the FIM film is to provide internal cabin lighting, it may be preferable to have the film located on the internal or B-side surface of the finished part. The films may be preprinted and preformed before being inserted into the mold. The mold is then closed and molten plastic resin is injected to fill the cavity for form the part.

A very small mold gap (depending on the coating thickness requirement) is then opened and a measured amount of the in-mold coating (IMC) is injected into the gap. The IMC coating can be injected onto an outside surface, and inside surface, or both surfaces of the molded window. Then the mold is closed, clamped, coin/compressed, and the coating cured. Depending on the specific formulation of the IMC coating and the required cure conditions, additional heating or cooling of the mold may be necessary to fully cure the coating. In addition, multiple steps related to coining and clamping may be required. Finally, the coated window is cooled, the mold opened, and the window ejected. The coated window comes out of the mold with the coating fully cured and ready for the deposition of an abrasion resistant layer.

The coated window may be removed from the mold using a robotic mechanism or system. In such a system, a robot or robotic arm hangs the coated part from a holder mechanism that is part of the mechanical system used to transport the part from the mold through the deposition of the abrasion resistant layer. If necessary, the holder mechanism may be transported to a temporary storage space, preferably located in at least a class-100 clean room. Although not preferred, the temporary storage may be required if a process malfunction or some other delay occurs before the abrasion resistant layer can be deposited. In such a case, the surface of the coated window may need to be cleaned prior to the deposition of the abrasion resistant layer. Such cleaning of the coated window may be performed using one of an aqueous wash system, alcohol wiping, alcohol rinsing, or a combination thereof. One advantage of the using the process of the present invention is that the surface of the coated window is more easily cleaned than the surface of a conventionally molded plastic window.

Any excess IMC coating injected into the mold can be collected by an accumulator and sent back to a coating circulation unit having a filter/cleaning feature. The coating viscosity should be in the range of about 1,000 mPa-s (centipoise) to about 10,000 mPa-s (centipoise).

The curing time for the coating is in the range of about 20 seconds to about 30 seconds at an elevated temperature. Thus, the processing time for the plastic part in the mold will be on the order of less than about 4 minutes with less than about 2 minutes being possible. Since the processing time for transfer of the coated part from the mold and the deposition of an abrasion resistant layer can be less than about 6 minutes, with less than about 3 minutes being possible, the overall processing time for the plastic glazing assembly can be on the order of less than about 10 minutes with less than about 5 minutes being possible and preferable.

Since the IMC coating will replicate the surface irregularities of the mold, the surface of the mold should be similar to a mirror finish (i.e., about a 6 micrometer finish) as known to one skilled-in-the-art of molding optical lenses. The degree of smoothness exhibited by the coating's surface will affect the level of gloss and/or the initial haze of the coated part. A surface irregularity or defect on the surface of the plastic part or any IMC coating applied during molding of the part may be obscured by adjusting the thickness of the IMC coating to cover the defect. A method that can increase the thickness of the IMC coating to be on the order of about 10 micrometers is to apply the IMC coating by opening the mold and spraying such coating onto the surface of the part.

Use of the plastic glazing assembly in an exterior application, as for any automotive component, requires that the IMC coating exhibit excellent weather resistance, chemical resistance (i.e. exposure to gasoline, acid, alkali), and hardness. A thin layer of an IMC coating formulation having at least one type of UVA dispersed within its composition may provide UV radiation protection to the plastic part on both external and internal surfaces. It is also desirable that a coating formulation can provide good adhesion to the abrasion resistant layer that is subsequently deposited. In this case, the IMC coating serves also as an adhesion tie-layer or interlayer between the molded plastic part and the abrasion resistant layer (see FIG. 3). Such a tie-layer will allow for the symmetric deposition of an abrasion resistant layer on both sides of the coated part having similar structure and using similar processing parameters.

In order to insure a rapid cure, the IMC coating is generally comprised of monomers and oligomers (i.e., acrylate and methacrylate functionally terminated monomers and oligomers) that cure by either free radical or Michael Addition mechanisms. Acrylated urethanes, epoxies, polyesters, and acrylics are candidates for use as the oligomers present in the IMC coating formulation. The IMC coating may be cured by the use of thermal heating, exposure to UV radiation, or a mixture thereof with thermal heating being preferable.

Fast curable aliphatic polyurethane coatings, especially polyester polyurethanes or acrylic polyurethanes formulated with anti-oxidant hindered amine light stabilizers (HALS) or UV stabilizers (UVA) possess the degree of weatherability and gloss retention necessary for use as an IMC coating. However, organic coatings are susceptible to thermal oxidation, photo-initiated oxidation, and chemical attack when exposed to the environment resulting in a degradation of properties that could lead to gloss loss, embitterment, and eventual delamination. On the other hand, polysiloxane coatings, characterized as a hybrid inorganic-organic system, are much more resistant to the above mentioned degradation mechanisms due to the chemical nature of the polysiloxane backbone. Consequently, polysiloxane coatings are more durable and weatherable than organic polyurethane coatings leading in some instances to an extended life-time for a coated substrate. However, polysiloxane coatings are also more expensive than most organic coatings.

In one embodiment of the present invention, the preferred coating formulation exhibits the cost associated with aliphatic acrylated polyurethane coatings and the durability associated with polysiloxane coatings. This combination is possible via the use of a hybrid, acrylated urethane-polysiloxane coating formulation. Similarly, fast curing epoxy-acrylic siloxane hybrid coatings can be good candidates for the IMC coating of a plastic glazing assembly.

Free radical, fast-cure hybrid coatings (i.e., acrylic esters and polysiloxane combination) can also be formulated using temperature sensitive initiators such as peroxides or azonitrile compounds. The selection of the peroxide is dependent on the temperature at which the coating will be cured and the required shelf life of the coating based on the molding conditions and cycle time for the plastic part.

In another embodiment, the incorporation of UV/EB cure mechanisms into a turntable stack mold may be utilized. In order to protect the plastic part, the coating composition may be formulated with an amount of UV absorber and stabilizer to meet the desired life-time requirements for a plastic glazing assembly. Examples of UV absorber and stabilizer combinations suitable for use in the IMC coating formulation include, but are not limited to, trazines, benzophenones, benzotriazoles, Tinuuvin 479/400 (Ciba, Tarrytown, N.Y.), UV stabilizers (Cytec Industries Inc., West Paterson, N.J.), and SDBR (Momentive Performance Materials, Wilton, Conn.).

Examples of several IMC coating compositions useful in the present invention, include but are not limited to, trimethylolethane triacrylate, trimethylolpropane triacrylate, pentaerythritol tetracrylate. These IMC coatings are polymerized, preferably by ultraviolet rays with the polymerization carried out in the absence of oxygen. In this case, a photosensitizer is used to activate the polymerizable coating formulation at a wavelength ranging from about 3,000 to about 4,000 Angstroms and cure via free radical chemistry, with the preferred photosensitizer being a carbonyl compound.

In another embodiment of the present invention, the IMC coating may be applied to the surface of the mold prior to the injection of the plastic resin to form the part. In this case, a barrier film having little or no affinity for the IMC coating is pressed closely against the coating to prevent the coating from coming into contact with oxygen. After the IMC coating is cured to the degree desired, the barrier film is removed, the mold is closed, and the cavity of the mold is filled with the plastic resin forming the part.

In another embodiment of the present invention, the IMC coating may comprise at least 30% by weight polyfunctional compounds selected from polymethacryloyloxy compounds having at least three methacryloyloxy groups in one molecule or polyacryloyloxy compounds having at least 3 acryloyloxy groups in each molecule. In this case, the compounds typically exhibit a molecular weight of about 250 to about 800 atomic mass units. This IMC coating may be applied either to the already molded plastic part or directly to the mold prior to the injection of the plastic resin to form the part. The IMC coating is then cured by ultraviolet radiation in a nitrogen atmosphere.

An IMC process is intended to save space and integrate the molding and coating process into one work cell. An IMC process also eliminates many additional post-processes, such as part cleaning, part handling, part re-orientation or re-location, part registration, and storage. To be able to use UV-curable coating chemistry inside a molding cell, a spin stack mold with four faces/stations that rotate 90° during each operation could be used. In such a machine, one side of the mold is opened for part ejection/removal and closed to shoot a first plastic resin into the cavity. The mold then opens and rotates 90° to a $2^{nd}$ station, where the mold closes for the optional shooting of a $2^{nd}$ plastic resin (e.g., a colored resin) in a cavity to form a border or other specialized feature. The mold opens again and rotates 90° to a $3^{rd}$ station where a robot sprays a UV-curable IMC coating as previously described onto the surface of the part in the mold's cavity. The tool again spins another 90° to a $4^{th}$ station where a UV lamp will cure the IMC coating and remove any residual solvent. Completing the cycle the mold is rotated 90° back to the $1^{st}$ position, the coated part ejected and the cycle started again.

The plastic resin used to mold the plastic part or substrate may be any thermoplastic or thermoset polymeric resin. These polymeric resins may include, but are not limited to, polycarbonate, acrylic, polyarylate polyester, polysulfone, polyurethane, silicone, epoxy, polyamide, polyalkylenes, and acrylonitrile-butadiene-styrene (ABS), as well as copolymers, blends, and mixtures thereof. In a preferred embodiment, the plastic part is an injection molded automotive plastic window or panel. Typically, a plastic window is substantially comprised of a transparent resin, but may incorporate opaque features, such as but not limited to an opaque frame or border. The preferred transparent, thermoplastic resins include, but are not limited to, polycarbonate, acrylic, polyarylate, polyester, and polysulfone, as well as copolymers and mixtures thereof.

The abrasion resistant layer may be comprised of either one layer or a combination of multiple interlayers of variable composition. The abrasion resistant layer may be applied by any vacuum deposition technique known to those skilled in the art, including but not limited to plasma-enhanced chemical vapor deposition (PECVD), expanding thermal plasma PECVD, plasma polymerization, photochemical vapor deposition, ion beam deposition, ion plating deposition, cathodic arc deposition, sputtering, evaporation, hollow-cathode activated deposition, magnetron activated deposition, activated reactive evaporation, thermal chemical vapor deposition, and any known sol-gel coating process.

In one embodiment of the present invention a specific type of PECVD process used to deposit the abrasion resistant layer comprising an expanding thermal plasma reactor is preferred. This specific process (called hereafter as an expanding thermal plasma PECVD process) is described in detail in U.S. patent application Ser. No. 10/881,949 (filed Jun. 28, 2004) and U.S. patent application Ser. No. 11/075,343 (filed Mar. 8, 2005), the entirety of both being hereby incorporated by reference. In an expanding thermal plasma PECVD process, a plasma is generated via applying a direct-current (DC) voltage to a cathode that arcs to a corresponding anode plate in an inert gas environment. The pressure near the cathode is typically higher than about 150 Torr, e.g., close to atmospheric pressure, while the pressure near the anode resembles the process pressure established in the plasma treatment chamber of about 20 mTorr to about 100 mTorr. The near atmospheric thermal plasma then supersonically expands into the plasma treatment chamber.

The reactive reagent for the expanding thermal plasma PECVD process may comprise, for example, octamethylcyclotetrasiloxane (D4), tetramethyldisiloxane (TMDSO), hexamethyldisiloxane (HMDSO), vinyl-D4 or another volatile organosilicon compound. The organosilicon compounds are oxidized, decomposed, and polymerized in the arc plasma deposition equipment, typically in the presence of oxygen and an inert carrier gas, such as argon, to form an abrasion resistant layer.

The abrasion resistant layer may be comprised of aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, hydrogenated silicon oxy-carbide, silicon carbide, tantalum oxide, titanium oxide, tin oxide, indium tin oxide, yttrium oxide, zinc oxide, zinc selenide, zinc sulfide, zirconium oxide, zirconium titanate, or a mixture or blend thereof. Preferably, the abrasion resistant layer is comprised of a composition ranging from $SiO_x$ to $SiO_xC_yH_z$ depending upon the amount of carbon and hydrogen atoms that remain in the deposited layer.

Figure 3A:
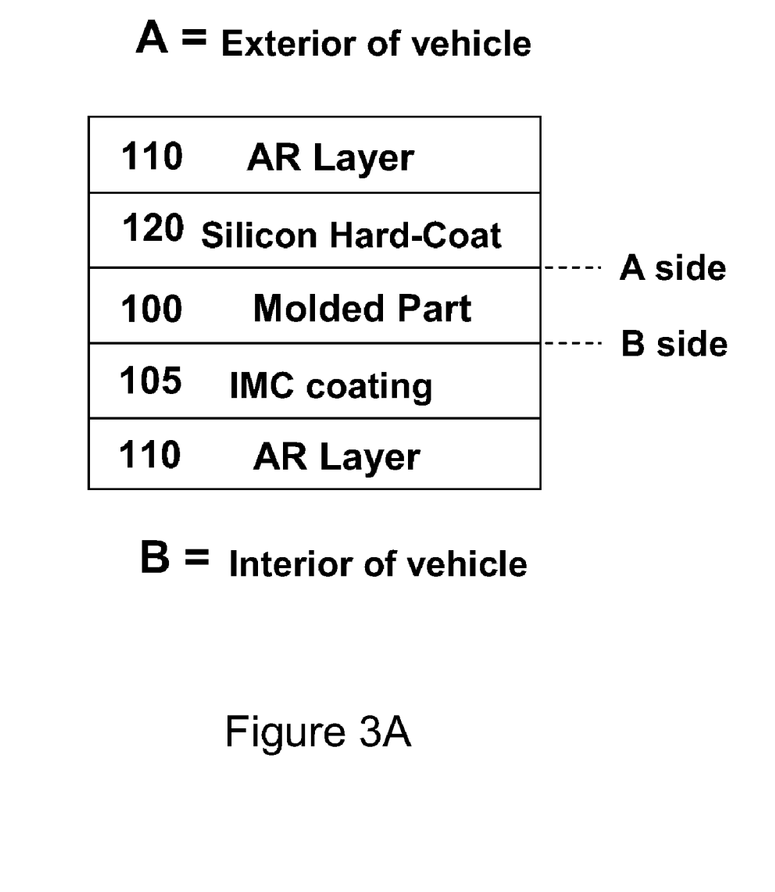
FIG. 3A is a diagrammatic representation of a cross-section of a glazing assembly from FIG. 1 according to one embodiment of the present invention.

Although the plastic glazing assembly portrayed in the following embodiments and examples is a plastic automotive window, one skilled-in-the-art would recognize that these embodiments and examples also may be utilized in conjunction with other plastic parts. Referring to FIG. 3A, an IMC coating 105 is applied directly to a molded plastic window 100 on one or both sides. In this example, polycarbonate resin was injection molded into a window 100 and a urethane-acrylate IMC coating 105 having a thickness in the range of about 20 to about 30 micrometers was applied to the interior B-side of the window. An IMC coating was applied onto multiple window samples. This IMC coating incorporated both a UVA and a peroxide curing agent. An abrasion resistant layer 110 was subsequently applied over the IMC coating 105 on each window sample via the use of an expanding thermal plasma PECVD process. The abrasion resistant layer 110 was deposited on a total of 12 samples using five different sets of process parameters or "recipes", including the "recipe" used to deposit a $Si_wO_xC_yH_z$ layer (Exatec® 900, Exatec LLC, Wixom, Mich.).

All 12 samples were found to pass a cross-hatch adhesion test (ASTM D3359-95) after 10 days immersion in 65° C. water. In this case, the IMC coating 105 was found to effectively act as an interlayer between the polycarbonate window 100 and the deposited abrasion resistant layer 110. All samples should also exhibit abrasion resistance according to ANSI Z26.1 protocols to be considered usable as an automotive window. According to ANSI Z26.1 protocols in order for a window to be used in AS2 applications, which are requisite for driver visibility, an abrasion resistance of less than 2% delta haze (1000 cycles) is required. Other window applications, such as AS4A applications, require abrasion resistance less than 10% delta haze (500 cycles). As depicted in FIG. 3A, it is possible that one side, e.g., exterior A-side, is coated with a conventional silicone hard-coat (SHC) 120, such as Exatec® SHX (Exatec LLC, Wixom, Mich.) prior to the deposition of the abrasion resistant layer 110. In this scenario, the IMC coating 105 could provide weatherability and/or act as a tie-layer for the interior B-side of the vehicle, while the conventional SHC coating 120 provides weatherability to the exterior A-side of the vehicle.

This example demonstrates that an IMC coating 105 may be compatible for use as a weatherable interface between a plastic window 100 and a deposited abrasion resistant layer 110. This embodiment also overcomes several problems related to the deposition of an abrasion resistant layer to the exterior A-side and interior B-side surfaces of a plastic glazing assembly where the surfaces upon which the abrasion resistant layer is deposited are different. In particular, the similarity in surface properties exhibited by the IMC coatings described above and a conventional SHC coating allow for the deposition of a similar abrasion resistant layer composition on both the A-side and B-side of the plastic glazing assembly. Thus the potential for the cross contamination of gas mixtures used on the A-side and B-side during concurrent deposition of the abrasion resistant layer is reduced, which in turn reduces the potential of product variability and substandard performance.

Figure 3B:
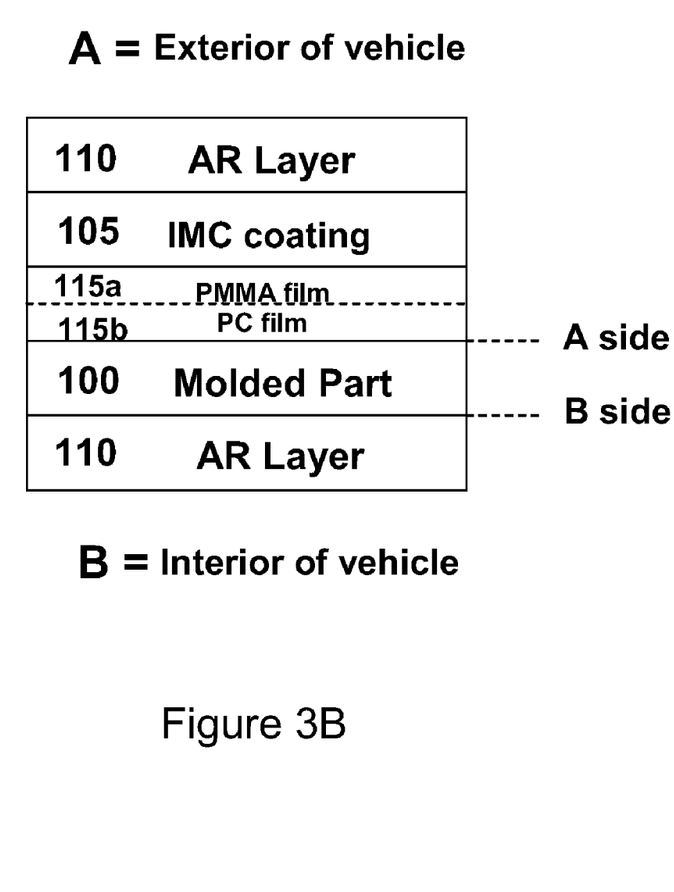
FIG. 3B is a diagrammatic representation of a cross-section of a glazing assembly from FIG. 1 according to another embodiment of the present invention.

Referring to FIG. 3B, an IMC coating is applied to a film insert molded (FIM) weatherable film 115 on the A-side of a plastic glazing assembly. One skilled-in-the-art would recognize that the FIM film 115 could also be used on the B-side of the plastic glazing depending upon the type of functionality being carried by the FIM film 115. The FIM film 115 may be a co-extruded film having different compositions on each side of the film. For example, the FIM film may comprise one surface of polymethylmethacrylate, PMMA 115a, and one surface of polycarbonate, PC 115b. Polycarbonate 115b has good optical, mechanical and thermal properties for use as automotive glazing, but relatively poor weatherability, while PMMA 115a has excellent optical and weatherability properties and could incorporate a UVA to protect the underlying plastic window. The combination of these properties into an FIM film 115 provides the benefits of both surfaces to the plastic glazing assembly. In this case, the IMC coating 105 would preferably also include a UVA designed to block the transmission of UV radiation having a wavelength less than about 165 nanometers that could damage the PMMA surface during the deposition of the abrasion resistant layer.

This embodiment demonstrates the possibility of manufacturing a plastic glazing assembly having a thin film of PMMA 115a, which can be formulated with enough UVA to protect the plastic window 100. By injecting an IMC coating 105 directly into mold it is possible to subsequently deposit an abrasion resistant layer 110 and deliver a finished window at a lower cost than possible using conventional coating technologies. This process can deliver appearance and surface functionalities that enable the use of lower cost resins, such as PMMA formulated with UV absorber, and to provide an environmentally friendly system (100% solids), thereby reducing costs associated with air emissions, waste disposal, long cycle times, part handling, scrap and inventory costs, and high capital needs associated with installing and/or maintaining a coating line or facility.

Figure 3C:
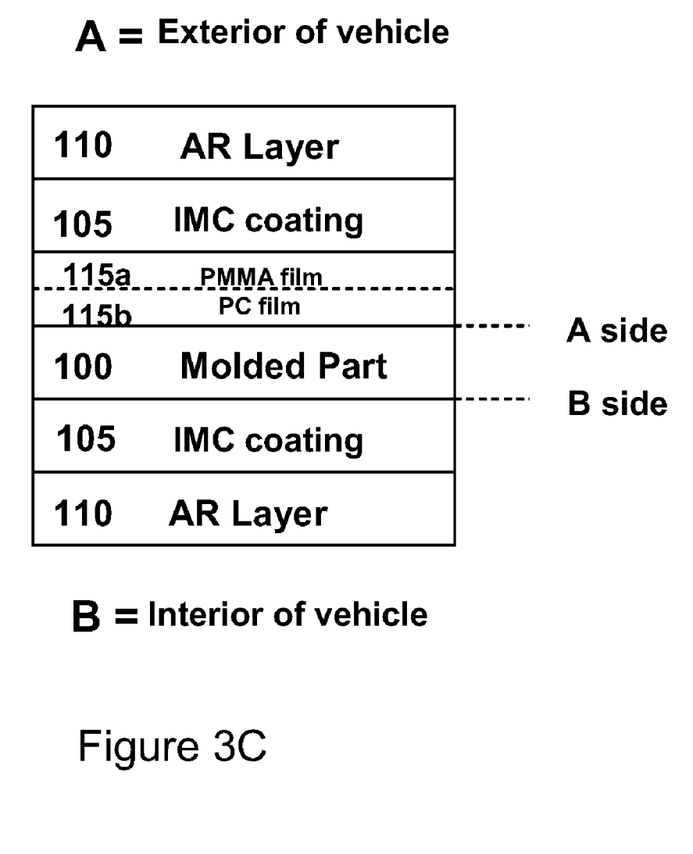
FIG. 3C is a diagrammatic representation of a cross-section of a glazing assembly from FIG. 1 according to another embodiment of the present invention.

Referring to FIG. 3C, IMC coatings are applied to a weatherable FIM film 115 on the A-side and to the plastic molded window 100 or an intervening functional layer (e.g. on an FIM film carrier) on the B-side. With a common IMC coating 105 applied, both the A-side and B-side of the plastic glazing assembly present the same "surface" for the deposition of an abrasion resistant layer 110, with respect to both material composition and mechanical compliance, the latter made relatively insensitive to the specific composition of the underlying IMC coating 105 due to the thickness of the IMC coating 105. In this case, the IMC coatings 105 described above provide adhesion of the abrasion resistant layer 110 over a wide range of deposition process parameters, such as oxygen flow rate. Thus there is sufficient flexibility in the deposition process for the abrasion resistant layer to meet ANSI Z26.1 abrasion resistance requirements with low initial haze.

Figure 3D:
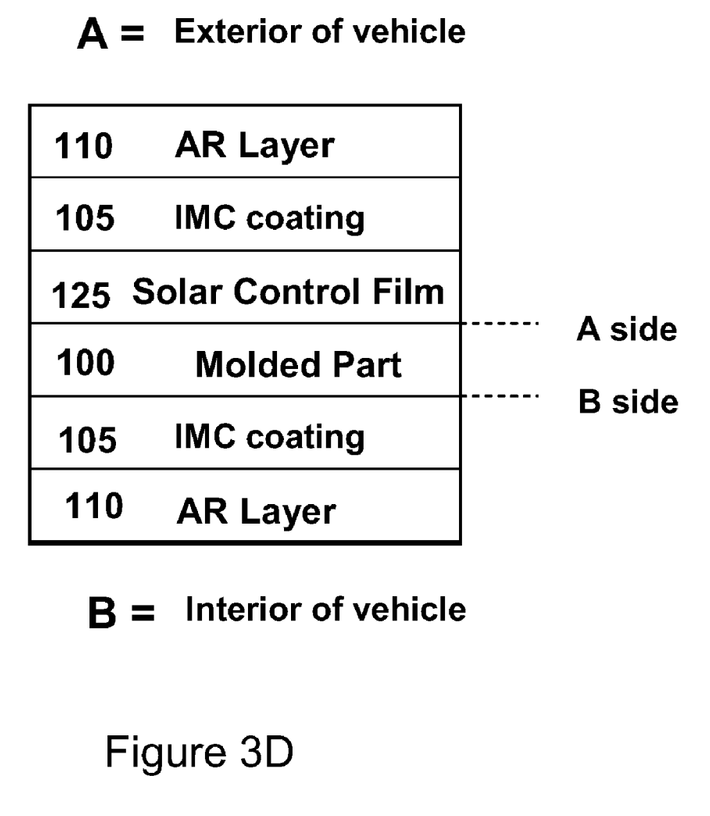
FIG. 3D is a diagrammatic representation of a cross-section of a glazing assembly from FIG. 1 according to another embodiment of the present invention.

Referring to FIG. 3D, an IMC coating 105 is applied to functional films 125 located on one or both sides of the plastic window that have been integrally formed as part of the window 100 using film insert molding. One example of such a functional film 125 is a solar control film (e.g., Hilite 70, Bekaert, Belgium). In this case, the IMC coating 105 also acts as an interlayer having good adhesion to both the solar control FIM film 125 and the deposited abrasion resistant layer 110.

Figure 3E:
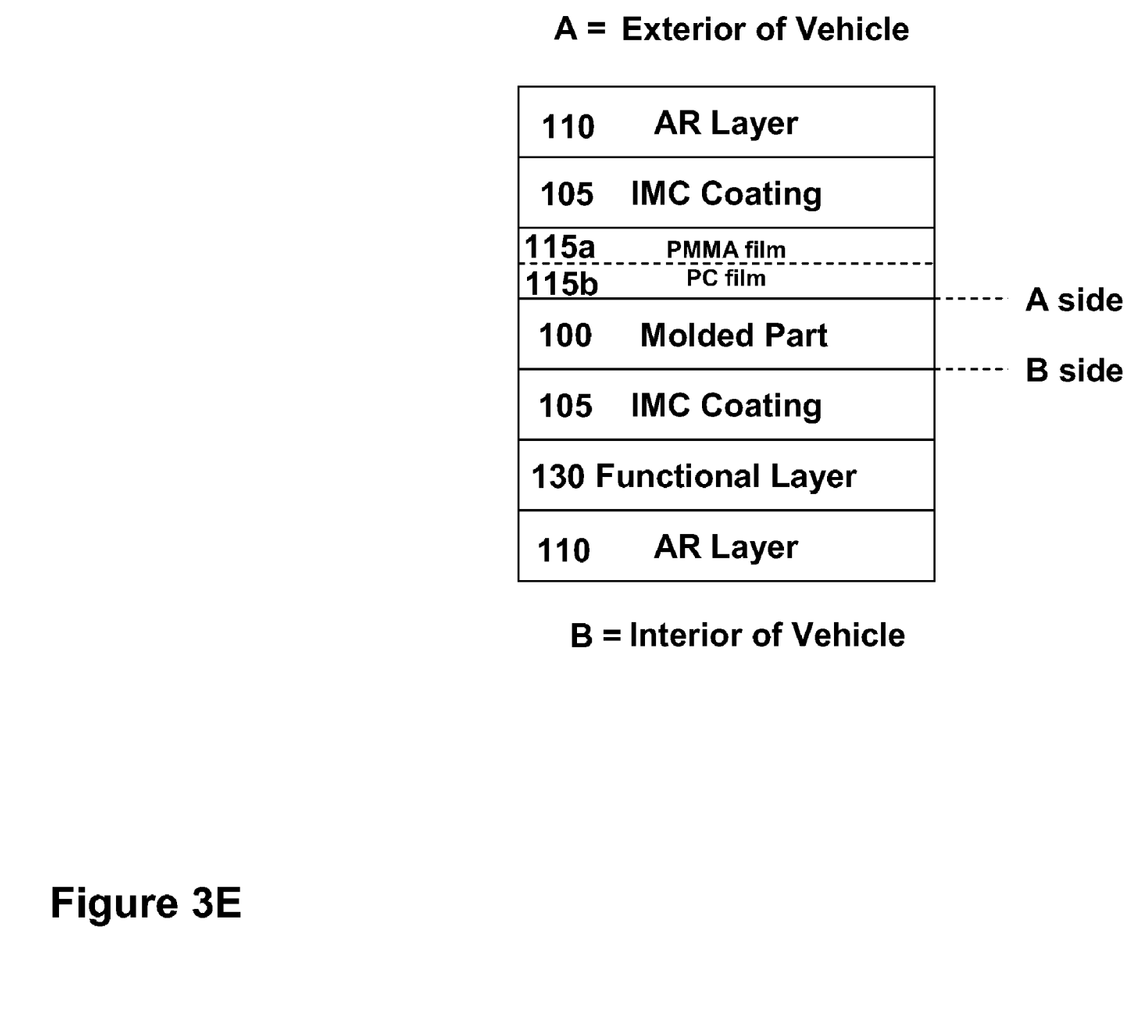
FIG. 3E is a diagrammatic representation of a cross-section of a glazing assembly from FIG. 1 according to another embodiment of the present invention.

Referring to FIGS. 3A-3D the IMC coating 105 serves as a favorable surface for the subsequent application of an abrasion resistant layer 110. In still another embodiment as shown in FIG. 3E, the IMC coating serves as a favorable surface for the deposition of a functional layer 130 other than an abrasion-resistant layer 110, such as a titanium dioxide layer 130 found useful for blocking UV radiation on either the A-side or B-side of the window.

Obviously, various elements of the embodiments discussed above can be combined. The method of manufacturing a plastic glazing assembly of the present invention provides a number of benefits for enhancing the performance of the plastic glazing assembly. Bonding between the IMC coating and the plastic part is excellent, since the coating is applied to a just-molded part. Overall yield for the process is greater than the yield obtained using a conventional coating process. Thick (tens of microns), IMC coatings, optionally combined with FIM films, and optionally applied to both sides of the molded PC part are also made possible. The present invention allows for the use of IMC coatings as the primary source of protection of in service parts from UV radiation incident on the B-side of the plastic glazing assembly and as a preferable surface for the subsequent deposition of an abrasion resistant layer. The abrasion resistant layer provides the necessary abrasion resistance to meet ANSI Z26.1 protocols.

A person skilled in the art will recognize from the previous description and examples that modifications and changes can be made to the present invention without departing from the scope of the invention as defined in the following claims. A person skilled in the art will further recognize that any measurements described are standard measurements that can be obtained by a variety of different test methods.

What is claimed is:

1. A method of manufacturing a plastic glazing assembly exhibiting weatherability and abrasion resistance comprising the sequential steps of:
    injecting a plastic resin into a mold to form a plastic part having an A-side and a B-side;
    applying a coating to at least one side of the plastic part while the plastic part is in the mold;
    curing the coating on the plastic part to form a coated part having a cured coating thereon;
    removing the coated part from the mold; and
    depositing an abrasion resistant layer over the cured coating of the coated part;
    wherein the cured coating has a substantially uniform and constant thickness; and
    wherein the abrasion resistant layer has a substantially uniform and constant thickness.

2. The method of manufacturing a plastic glazing assembly of claim 1, wherein all of the steps are completed in less than about 10 minutes.

3. The method of manufacturing a plastic glazing assembly of claim 2, wherein all of the steps are completed in less than about 5 minutes.

4. The method of manufacturing a plastic glazing assembly of claim 2, wherein the part is not manually manipulated until after the abrasion resistant layer is deposited.

5. The method of manufacturing a plastic glazing assembly of claim 1, wherein the step of injecting the plastic window forms the part in the shape of an automotive window.

6. The method of manufacturing a plastic glazing assembly of claim 1, wherein the step of applying the coating includes establishing a gap between the plastic part and the surface of the mold, the coating being injected into the gap.

7. The method of manufacturing a plastic glazing assembly of claim 6, wherein the step of establishing the gap between the molded part and the surface of the mold forms the gap with a substantially constant width.

8. The method of manufacturing a plastic glazing assembly of claim 1, wherein the step of depositing an abrasion resistant layer is done using a vacuum deposition technique.

9. The method of manufacturing a plastic glazing assembly of claim 8, wherein the vacuum deposition technique is selected as one of plasma-enhanced chemical vapor deposition (PECVD), expanding thermal plasma PECVD, plasma polymerization, photochemical vapor deposition, ion beam deposition, ion plating deposition, cathodic arc deposition, sputtering, evaporation, hollow-cathode activated deposition, magnetron activated deposition, activated reactive evaporation, thermal chemical vapor deposition, or any known sol-gel coating processes.

10. The method of manufacturing a plastic glazing assembly of claim 8, wherein the vacuum deposition technique is expanding thermal plasma enhanced chemical vapor deposition.

11. The method of manufacturing a plastic glazing assembly of claim 1, wherein the step of curing the coating includes one of thermal curing, radiation curing, and a combination of thermal and radiation curing.

12. The method of manufacturing a plastic glazing assembly of claim 1, further comprising the step of hanging the coated part from a holder mechanism that is a subcomponent of a mechanical system used to transport the part from the mold for the deposition of the abrasion resistant layer.

13. The method of manufacturing a plastic glazing assembly of claim 1, further comprising the step of depositing an abrasion resistant layer directly onto any uncoated surface of the coated part.

14. The method of manufacturing a plastic glazing assembly of claim 1, further comprising the step of placing a plastic film into the mold prior to injecting the plastic resin.

15. The method of manufacturing a plastic glazing assembly of claim 14, further comprising the step of forming the plastic film to substantially match the shape of one surface of the mold.

16. The method of manufacturing a plastic glazing assembly of claim 15, wherein the one surface of the mold that matches the plastic film defines the A-side of the plastic part.

17. The method of manufacturing a plastic glazing assembly of claim 14, further comprising the step of printing at least one of a border, defroster, antenna, or logo on the plastic film prior to placing the plastic film into the mold.

18. The method of manufacturing a plastic glazing assembly of claim 1, further comprising the step of storing the coated part before the deposition of an abrasion resistant layer.

19. The method of manufacturing a plastic glazing assembly of claim 18, wherein the storing of the coated part is done in at least a class-100 clean room.

20. The method of manufacturing a plastic glazing assembly of claim 19, further comprising cleaning the coated part prior to the deposition of an abrasion resistant layer.

21. The method of manufacturing a plastic glazing assembly of claim 20, wherein the cleaning of the coated part is performed using one of an aqueous wash, alcohol wiping, alcohol rinsing, or a combination thereof.

22. The method of manufacturing a plastic glazing assembly of claim 1, further comprising the deposition of a functional layer onto the surface of the cured coating prior to the deposition of an abrasion resistant layer.

23. The method of manufacturing a plastic glazing assembly of claim 1, further comprising the application of a silicone hard-coat to any uncoated side of the coated part prior to the deposition of the abrasion resistant layer.

24. A method of manufacturing a plastic glazing assembly exhibiting weatherability and abrasion resistance comprising the steps of:
    applying a coating to at least one surface of a mold;
    placing and pressing a barrier film against the coating, the barrier film having no affinity for the coating and preventing the coating from being exposed to oxygen prior to being cured;
    curing the coating;
    removing the barrier film;
    closing the mold;
    injecting a plastic resin into the mold including the coating on the at least one surface of the mold to form a coated part;
    removing the coated part from the mold; and
    subsequently depositing an abrasion resistant layer over the coating of the coated part.

25. The method of manufacturing a plastic glazing assembly of claim 24, wherein the step of curing the coating includes irradiating the coating with UV radiation.

26. The method of manufacturing a plastic glazing assembly of claim 25, wherein all of the steps are completed in less than about 10 minutes.

27. The method of manufacturing a plastic glazing assembly of claim 24, wherein the step of depositing an abrasion resistant layer is done using a vacuum deposition technique.

28. The method of manufacturing a plastic glazing assembly of claim 27, wherein the vacuum deposition technique is expanding thermal plasma enhanced chemical vapor deposition.

29. The method of manufacturing a plastic glazing assembly of claim 24, further comprising the deposition of a functional layer onto the surface of the cured coating prior to the deposition of an abrasion resistant layer.

30. The method of manufacturing a plastic glazing assembly of claim 24, further comprising the application of a silicone hard-coat to any uncoated side of the coated part prior to the deposition of the abrasion resistant layer.

* * * * *